United States Patent [19]
Lee

[11] Patent Number: 5,870,238
[45] Date of Patent: Feb. 9, 1999

[54] SWITCHING OFFSET VALUE AS NEED TO IMPROVE SECTOR PULSE GENERATION FOR A HARD DISK DRIVE

[75] Inventor: Jae-Sung Lee, Seoul, Rep. of Korea

[73] Assignee: SamSung Electronics Co., Ltd., Kyungki-do, Rep. of Korea

[21] Appl. No.: 767,435

[22] Filed: Dec. 16, 1996

[30] Foreign Application Priority Data

Dec. 15, 1995 [KR] Rep. of Korea ................. 1995/50723

[51] Int. Cl.$^6$ ........................................ G11B 5/09
[52] U.S. Cl. ............................. 360/51; 360/77.08
[58] Field of Search .................. 360/51, 72.1, 75, 360/77.08, 49; 371/10.2; 711/4; 369/47, 54

[56] References Cited

U.S. PATENT DOCUMENTS

| | | | |
|---|---|---|---|
| 4,746,998 | 5/1988 | Robinson et al. | 360/72.1 |
| 4,811,124 | 3/1989 | Dujari et al. | 360/49 |
| 5,068,755 | 11/1991 | Hamilton et al. | 360/72.1 |
| 5,271,018 | 12/1993 | Chan | 371/10.2 |
| 5,276,564 | 1/1994 | Hessing et al. | 360/51 |
| 5,367,652 | 11/1994 | Golden et al. | 711/4 |
| 5,506,735 | 4/1996 | Okazaki | 360/75 |
| 5,523,903 | 6/1996 | Hetzler et al. | 360/77.08 |
| 5,666,238 | 9/1997 | Igari et al. | 360/77.08 |

*Primary Examiner*—Aristotelis M. Psitos
*Assistant Examiner*—Patrick Wamsley
*Attorney, Agent, or Firm*—Robert E. Bushnell, Esq.

[57] ABSTRACT

A sector pulse generating technique for a hard disk drive, includes storing an original time value before defect occurs in the hard disk drive as a first sector pulse value; storing an offset value after the defect occurs as a second sector pulse value; switching the offset value as needed; and comparing the value switched in the above switching step with a reference value and generating a sector pulse as a result of the comparison.

3 Claims, 5 Drawing Sheets

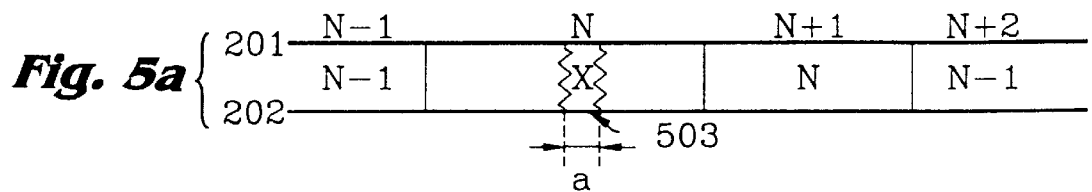
Fig. 5a
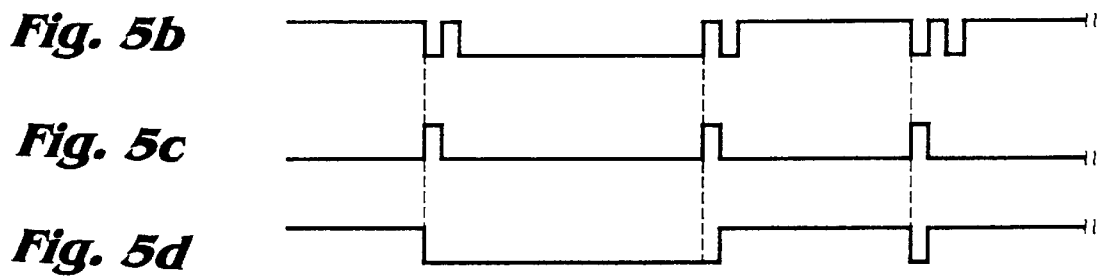
Fig. 5b
Fig. 5c
Fig. 5d
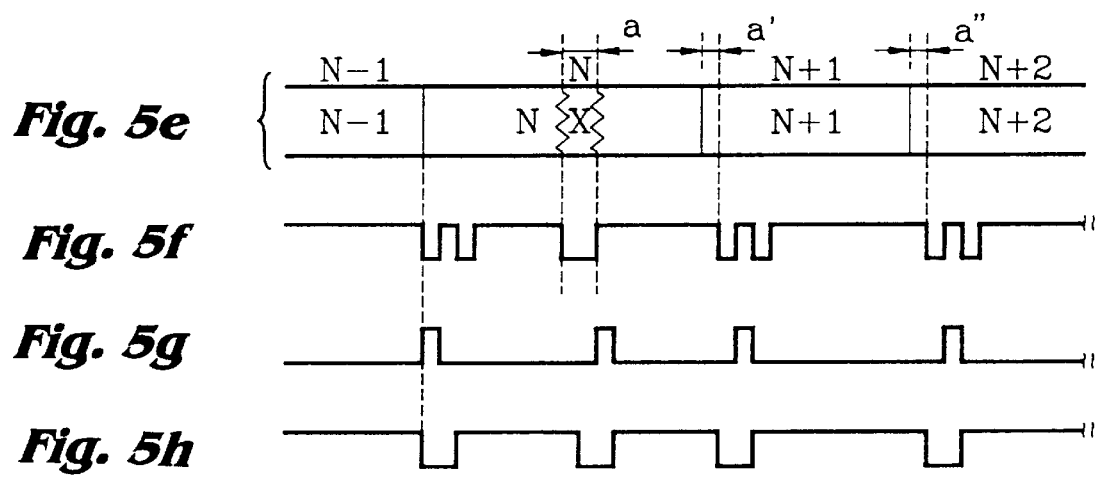
Fig. 5e
Fig. 5f
Fig. 5g
Fig. 5h
Fig. 5i
| data field | Jitter Pad | Defect Pad | Jitter Pad | Data PLL | Data Sync | Data field |
|---|---|---|---|---|---|---|
|  | 2 | 8 | 2 | 12 | 1 |  |

SWITCHING OFFSET VALUE AS NEED TO IMPROVE SECTOR PULSE GENERATION FOR A HARD DISK DRIVE

CLAIM OF PRIORITY

This application make reference to, incorporates the same herein, and claims all benefits accruing under 35 U.S.C §119 from an application entitled SECTOR PULSE GENERATING DEVICE AND METHOD IN HARD DISK DRIVE earlier filed in the Korean Industrial Property Office on the 15th day of Dec. 1995, and there assigned Ser. No. 50723/1995.

BACKGROUND OF THE INVENTION

1. Field of the Invention

The present invention relates to a sector pulse generating technique in a hard disk drive, it and more particularly, to a sector pulse generating technique using a defect swallowing method therein.

2. Description of the Related Art

In general, a hard disk drive should be free from defects which may be generated due to a poor material, during manufacturing, or upon delivering a product. In fact, since most customers want to buy a defect-free drive, it is necessarily required to effectively eliminate the effects of generated defects without having any adverse effects on a the performance of the drive and accordingly, such elimination techniques have become a key concern to a manufacturers.

Moreover, as media recording technique are rapidly being developed, a real recording density has increased in proportion thereto. Therefore, a negligible defect which could be disregarded in the conventional system now has now a serious adverse effect. Accordingly, a more perfect medium is required and due to this, the product cost is inevitably increased. In order to overcome these disadvantages, various error correction methods using an ECC logic of a drive controller and a defect removing method using software processing have arisen.

The EEC correction method utilizes hardware which includes a plurality of disks rotated by a spindle motor driver. The disks have support arms extending from an E-block assembly connected to a VCM driver and disposed towards the disks. A preamplifier preamplifies the signal which is picked up by one of the heads at the time of reading so as to supply an analog read signal to a read/write channel circuit. The preamplifier writes encoded write data supplied from the read/write channel circuit onto the disk through one corresponding head at the time of writing. The read/write channel circuit detects a data pulse from the read signal supplied from the preamplifier and alternatively decodes the detected data pulse and supplies the decoded data pulse to the preamplifier. A DDC writes data received from a host computer onto the disk through the read/write channel circuit and the preamplifier. The DDC interfaces a communication between a host computer and a CPU. Data transmitted between the host computer, the CPU and the read/write channel circuit is temporarily stored in a buffer RAM. The CPU controls the DDC in response to a read/write command received from the host computer and controls a track seek and a track follow. All of the established values and an execution program of the CPU are stored in a ROM. The CPU drives the S/M driver to rotate the disks in accordance with a control value for controlling the rotation of the disks, the control value being generated by the CPU. A disk signal control generates all timing signals necessary for the read/write operation under the control of the CPU and decodes the servo information and supplies the decoded servo information to the CPU. And ECCOTF (ECC on the fly) method which simultaneously processes errors of an entire sector while reading data of a next sector by hardware has been used. Recently, concern has been focused on a manner of effectively expanding the ECC correction span. Furthermore, a Reed Solomon S/W ECC method capable of processing errors using software has been used, through it is less effective than the ECCOTF method. However, if a defective sector cannot be corrected through the above two methods, a method has been used of skipping a defective sector and then reading the other non-defective sectors. In this case, it seems to a user as if the disk operates normally. If general, a method of removing defects, as mentioned above, includes a defect skipping method and a defect moving (vectoring) method. The defect skipping method, which uses several spare sectors in a unit of a track or a cylinder, upon the generation of a defect, moves a generated defect to a sector just next to the defective sector. The defect moving, which moves the generated defect to a maintenance cylinder or to another defect-free location, is used in a situation when spare sectors are all used, or, in drives employing the spare sector scheme.

In case of using these methods, although a defect occurs on only part of one sector (1–7 bytes), the entire sector (512 bytes) must be discarded. One sector includes an ID field, a sync and a dummy pad field, etc., and has capacity of about 570 bytes and spare areas for the defect should previously be prepared in a given part of the drive, thereby increasing a capacity loss in the drive. Furthermore, since data of the defective sector has to be repaired, data must be read from another location. In the defect skipping method, a time delay corresponding to one sector is generated, but, in the defect moving method, a seek time and a latency time are required and accordingly, the performance is substantially reduced. On the other hand, with a defect swallowing method, only the defective part is skipped and the remaining non-defective parts are used and as a result, this method can relatively reduce the capacity loss and does not need much spare areas.

The Golden, et al. patent, U.S. Pat. No. 5,367,652 entitled DISC DRIVE TRANSLATION AND DEFECT MANAGEMENT APPARATUS AND METHOD, discloses a disk drive translation and defect management technique in which a controller having an index table and a defect table is used to offset a value of the location of a defect, the location being stored in the defect table.

The following patents each disclose features in common with the present invention but do not teach or suggest the specifically recited features thereof:

U.S. Pat. No. 5,506,735 issued to Okazaki entitled Magnetic Disk Drive Having Programmable Sector Pulse Generator And Processor Determined Track Zones.

U.S. Pat. No. 5,276,564 issued to Hessing, et al. entitled Programmable Start-Of-Sector Pulse Generator For A Disk Drive Using Embedded Servo Bursts And Split Data Fields.

U.S. Pat. No. 5,271,018 issued to Chan entitled Method And Apparatus For Media Defect Management And Media Addressing.

U.S. Pat. No. 5,068,755 issued to Hamilton, et al entitled Sector Pulse Generator For Hard Disk Drive Assembly.

U.S. Pat. No. 4,746,998 issued to Robinson, et al. entitled Method For Mapping Around Defective Sectors In A Disc Drive.

SUMMARY OF THE INVENTION

Accordingly, it is an object of the present invention to provide a sector pulse generating technique capable of improving the capacity and performance of a disk which skips only a defective part and uses the remaining non-defective parts for removing defects on a disk.

To achieve this and other objects, there is provided a sector pulse generating technique for a hard disk drive by storing an original time value before a defect occurs in the hard disk drive as a first sector pulse value; storing an offset value after the defect occurs as a sector pulse value; switching the offset value as needed; and comparing value switched in the above switching step with a reference value and generating a sector pulse.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 5a–5i are views illustrating an operation timing diagram according to one embodiment of the present invention.

DETAILED DESCRIPTION OF THE PREFERRED EMBODIMENT

Figure 1:
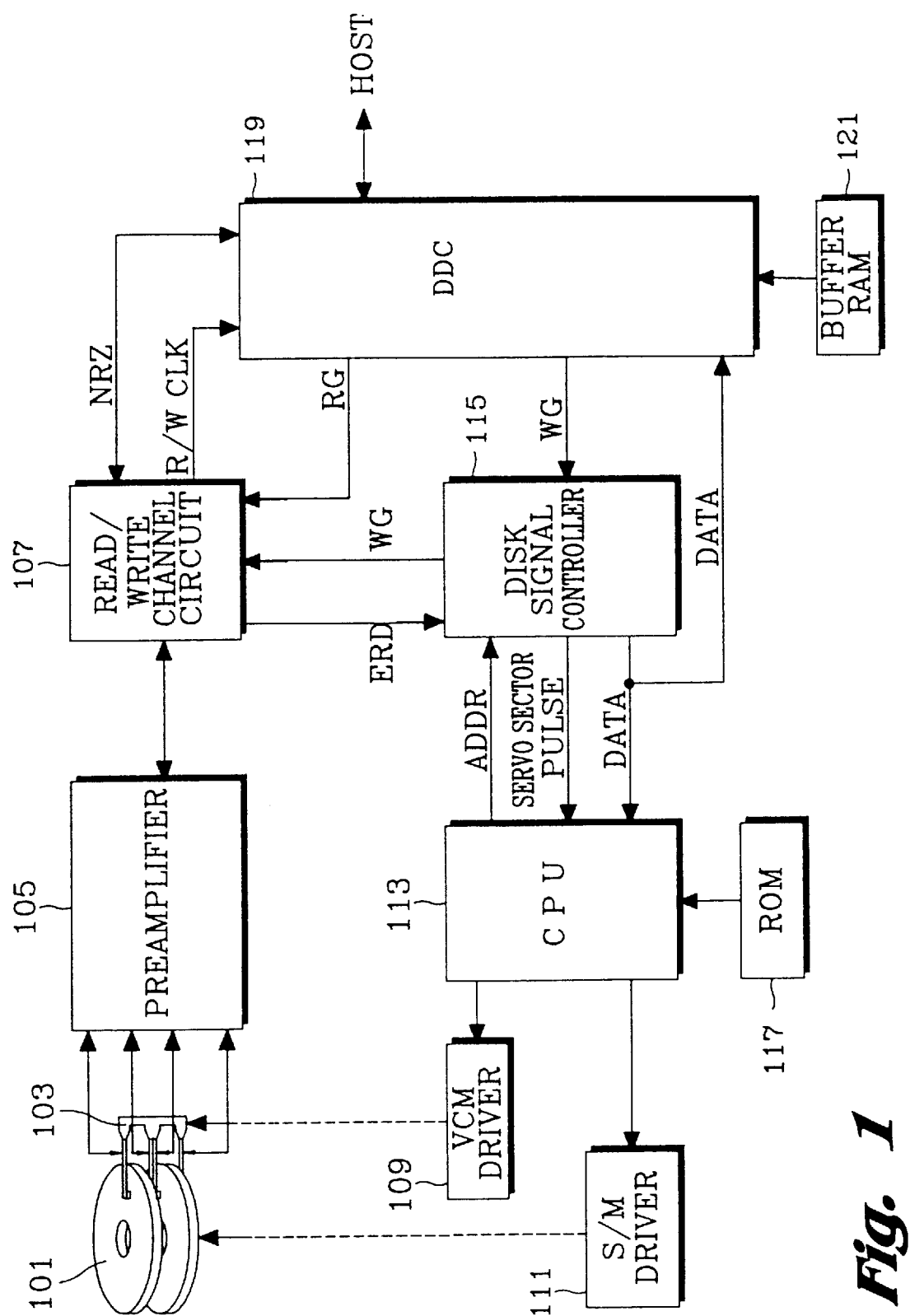
FIG. 1 is a view illustrating a control system of a hard disk drive.

The ECC correction method utilizes a hardware constructed as in FIG. 1. In a structure of FIG. 1, disks 101 are rotated by a spindle motor driver 111. The disks 101 have support arms extending from an E-block assembly 103 connected to a VCM driver 109 and disposed, toward the disks 101. A preamplifier 105 preamplifier a signal which is picked up by one of heads at the time of reading so as to supply an analog read signal to a read/write channel circuit 107. The preamplifier 105 writes encoded write data supplied from the read/write channel circuit 107, onto the disk through one corresponding head at the time of writing. The read/write channel circuit 107 detects a data pulse from the read signal supplied from the preamplifier 105, and alternatively decodes the detected data pulse and supplies the decoded data pulse to the preamplifier 105. A DDC 119 writes data received from the host computer onto the disk through the read/write channel circuit 107 and the preamplifier 105. Also, the DDC 119 interfaces a communication between a host computer and a CPU 113. Data transmitted between the host computer, the CPU 113, and the read/write channel circuit 107 is temporarily stored in a buffer RAM 121. The CPU 113 controls the DDC 119 in response to a read or write command received from the host computer and controls a track seek and a track follow. All established values and an execution program of the CPU 113 are stored in a ROM 117. The CPU 113 drives the S/M driver 111 to thereby rotate the disks 101 in accordance with a control value for controlling a rotation of the disks 101, the control value being generated by the CPU 113. A disk signal controller 115 generates all timing signals necessary for the read/write operation under the control of the CPU 113, and decodes servo information and then supplies the decoded servo information to the CPU 113. An ECCOTF (ECC on the fly) method which simultaneously processes errors of an entire sector while reading data of a next sector by hardware has been used. Recently, concern has been focused on a matter of effectively expanding the ECC correction span. Furthermore, a Reed Solomon S/W ECC method capable of processing errors using software has been used, though it is less effective than ECCOTF method. However, if a defective sector cannot be corrected through the above two methods, a method has been used of skipping a defective sector and then reading the other non-defective sectors. In this case, it seems to a user as if the disk operates normally. In general, a method of removing defects, as mentioned above, includes a defect skipping method and a defect moving (vectoring) method. The defect skipping method, which uses several spare sectors in a unit of a track or a cylinder, upon the generation of a defect, moves a generated defect to a sector just next to the defective sector. The defect moving (vectoring) method, which moves the generated defect to a maintenance cylinder or another defect-free location, is used in a situation when spare sectors are all used, or, in drives employing the spare sector scheme.

Figure 2:
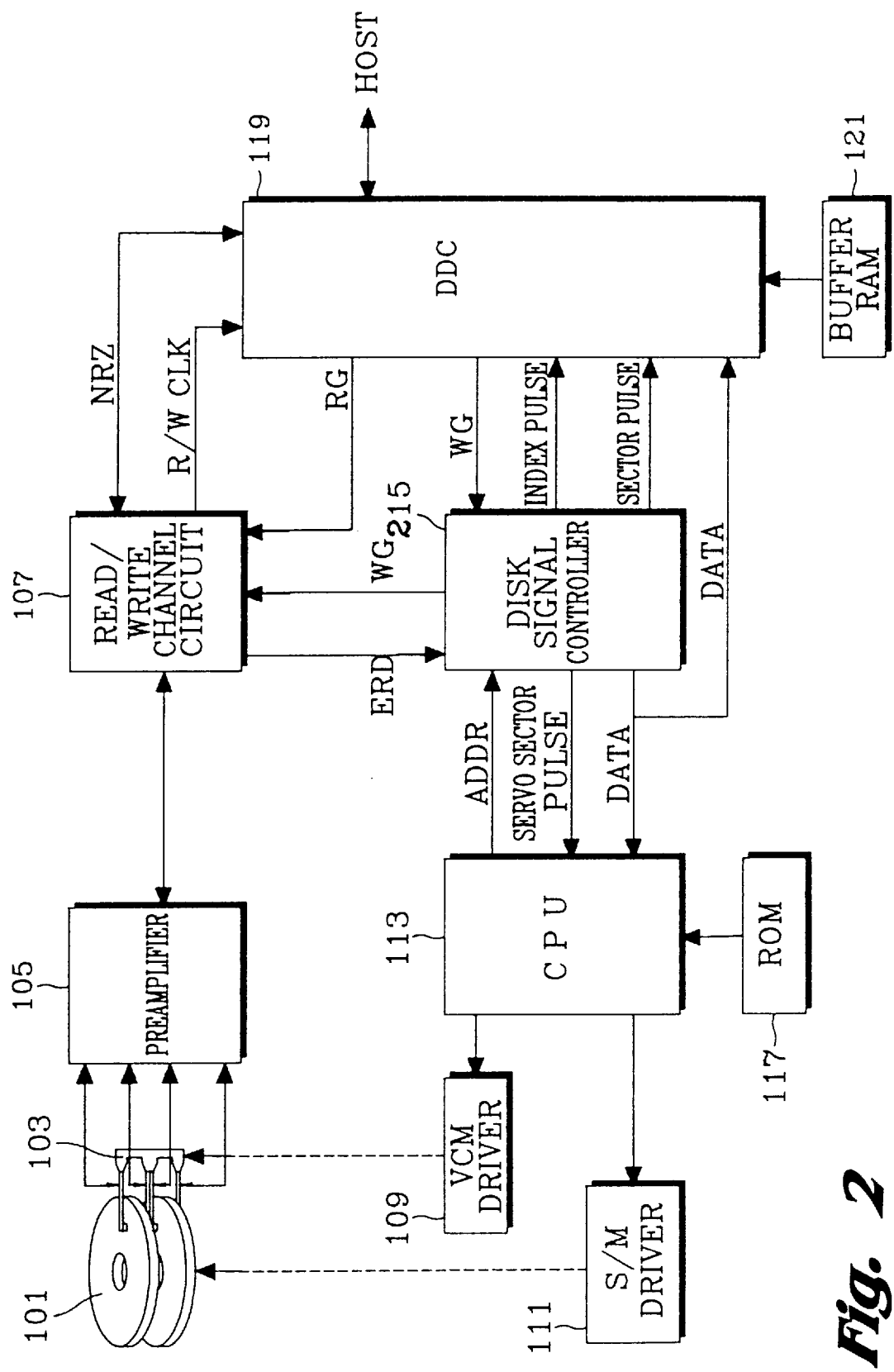
FIG. 2 is a view illustrating a control system of the hard disk drive according to one embodiment of the present invention.

FIG. 2 is a block diagram illustrating an embodiment in accordance with the present invention. The basic difference between FIG. 1 and FIG. 2 is a function of the disk signal controller. The disk signal controller 215 receives an address ERD and provides an index pulse and a sector pulse to the DDC 119, so that only a defective part in a sector where the defect occurs is skipped for removing the defect of the disk 101 under the control of the DDC 119, and the remaining non-defective parts can be utilized.

Figure 3:
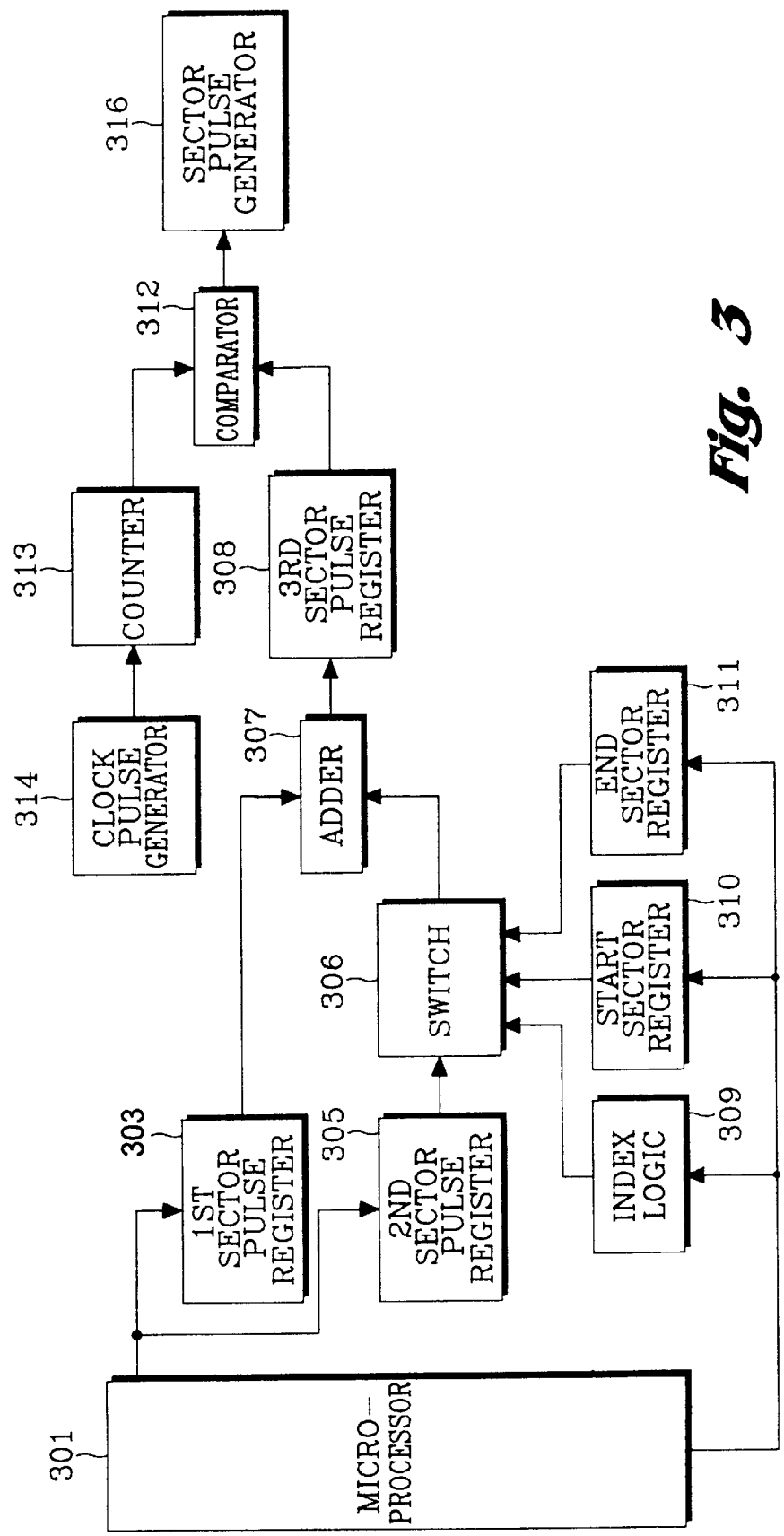
FIG. 3 is a view illustrating a detailed block diagram of a disk signal controller of FIG. 2.

FIG. 3 is a view illustrating a detailed block diagram of the disk signal controller of FIG. 2. A microprocessor 301 controls the overall operation of a hard disk drive, and a first sector pulse register 303 is for storing time values used for a sector pulse generation under the control of the microprocessor 301. A second sector pulse register 305 is for storing offset values, and has a zero value in a track free from a defect skip. An index logic circuit 309 generates an index signal, and a start sector register 310 stores a start sector value, under the control of the microprocessor 301. An end sector register 311 stores an end sector value, and a switch 306 selects outputs of the index logic circuit 309, start sector register 310 and end sector register 311. An adder 307 adds an output of the first sector pulse register 303 to an output of the switch 306 which selects outputs of the index logic circuit 309, start sector register 310 and end sector register 311 according to an output sectors pulse generation timing of the second sector pulse register 305. A third sector pulse register 308 stores an end value for the sector pulse generation output from the adder 307. A clock pulse generator 314 generates given clock pulses, and a counter 313 counts the pulses output from the clock generator 314. A comparator 312 compares an output of the counter 313 with an output of the third sector pulse register 308, and detects whether or not the two output values are identical to each other. If the two values are identical to each other, a sector pulse generator 316 generates a sector pulse.

Figure 4:
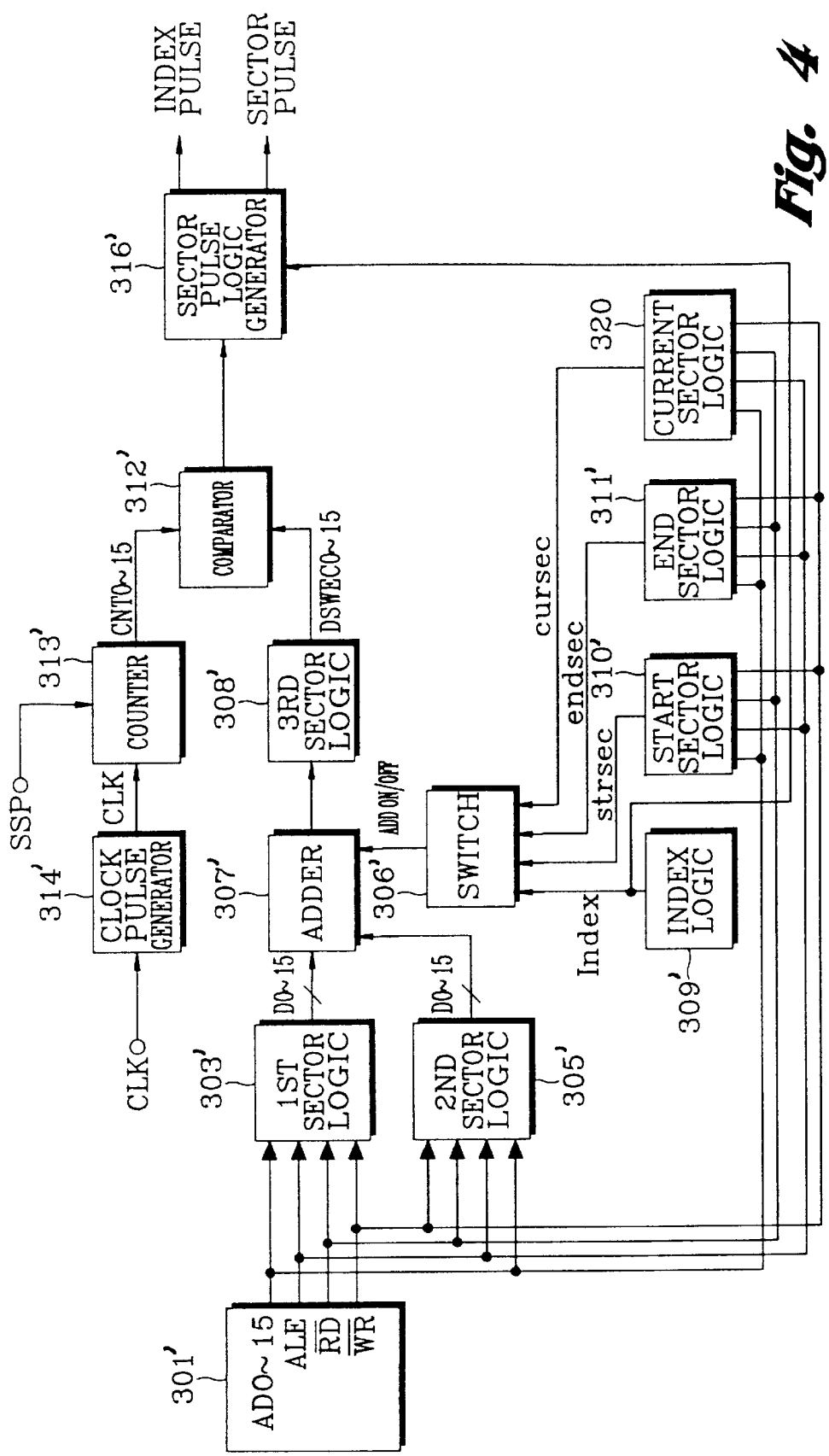
FIG. 4 is a view illustrating a detailed block diagram of a disk signal controller of FIG. 2 according to another embodiment of the present invention.

FIG. 4 is a view illustrating a detailed circuit of another disk signal controller 215 of FIG. 2, different from that of FIG. 3, with a microprocessor 301' for controlling a hard disk drive; a first sector logic 303' circuit for generating a first sector by an address ADO-15, an address latch signal ALE and a read/write control signal WR/RD generated by the micro-processor 301; a second sector pulse logic circuit 305' for generating an offset signal by "0" in a track not having the defect skip by the address ADO-15, the address latch signal ALE and the read/write control signal WR/RD by the microprocessor 301'; a start sector logic circuit 310' for generating a start signal by the address ADO-15, the address latch signal ALE and the read/write control signal WR/RD generated by the microprocessor 301'; an index logic circuit 309' for generating an index signal; an end sector logic circuit 311' for generating an end signal by the address ADO-15, the address latch signal ALE and the read/write control signal WR/RD generated by the microprocessor 301'; a current sector logic circuit 320 for generating a current sector signal by the address ADO-1S, the address latch signal ALE and the read/write control signal WR/RD generated by the microprocessor 301'; a switch 306' for selecting outputs of the index logic circuit 309', the start sector logic circuit 310', the end sector logic circuit 311' and the current sector logic circuit 320 by an output of the second sector pulse logic circuit 305'; an adder 307' for adding an index value, a start sector value, an end sector value and a current sector value selected by the switch 306' to the sector pulse generation timing generated by the first sector pulse logic circuit 303'; a third sector pulse logic circuit 308' for generating a third sector pulse by the value outputted from the adder 307'; a clock pulse generator 314' for generating a system clock by a basic clock input of the clock terminal CLK; a counter for counting an output of the clock generator 314'; a comparator 312' for comparing an output of the counter 313' with an output of the third sector pulse logic circuit 308', thereby detecting whether the two outputs are equal to each other; and a sector pulse logic generator 316' for generating a sector pulse when the two outputs are determined to be equal by the comparator 312'.

FIG. 5 shows the timing diagram illustrating a defect sector skipping, in case a defect X not corrected by the ECC occurs in the Nth sector from the index of any one track, a defective sector is skipped and instead of it, a sector N+1 just next thereto is read. Then, physical sector location N+1 becomes logical sector location N, and the physical sector locations of the rest of the sectors are reduced by one, accordingly. FIG. 5b explains the timing of a read gate RG and a write gate WG upon read/write operations, it can be found that the defective sector N is skipped entirely, and a pulse of the read gate RG with a small width is indicative of an ID search operation.

FIG. 5c shows a variation of a sector location upon a defect swallowing, FIG. 5d is a timing diagram for read/write operation upon a defect swallowing, and FIG. 5e shows spare areas needed upon a defect swallowing.

With the aforesaid defect swallowing method, only a defective part in a sector where a defect occurs is skipped and the remaining non-defective parts other than the defective part can be used. In other words, a disk formatter (or disk controller) freezes a disk operation (i.e., read/write operation) and the ECC processing just in front of the defective part for a moment, and skips the defective part. Thereafter, the disk formatter performs re-synchronization, and then unfreezes the ECC processing and continues to process the remaining parts of the sector. Using this method, a spare data PLL field, and data synchronous field variation part are required, and also jitter pads before/after the defect are required. Herein, the jitter is attributed to a variation of the spindle speed and a gate delay of the H/W logic is required. Split information is stored in the ID field area to be used. Meanwhile, if the defect is not processed, the location of the defective sector should be reassigned to another location. For this purpose if a defective part X not corrected by the ECC occurs in the Nth sector from the index of any one track, as shown in FIG. 5g, the defective sector N is moved into the sector N+1 next thereto. Then, the physical sector location N+1 becomes the logical sector location N, and the physical sector location of the remaining sectors are reduced by one, accordingly.

Upon read/write operations, the read gate RG and write gate WG operate as shown in FIG. 5b, and the defective sector N is skipped in whole. The pulse of the read gate RG with the small width is indicative of the ID search operation.

For example, if the defect X of a length "a" is generated in the Nth physical sector location, the sector is skipped by the length "a" as shown in FIG. 5e and accordingly, the length of the sector is extended by a' as compared with the original length of the sector. Next sectors N+1 and N+2 . . . are respectively delayed by a" and a'" compared with their respective original timings and accordingly, the following equation can be derived.

$$a + \text{area needed for the defect swallowing processing} = a' = a'' \ldots$$

Wherein, the area needed for the defect swallowing processing corresponds to jitter pad before defect+jitter pad after defect+data PLL+data sync as shown in trace FIG. 5e. In FIG. 5e, in order to swallow the 8 bytes defect, 25 bytes (Jitter pad+defect+jitter pad+PLL+sync=2+8+2+12+1=25) are required, but, if using the track spare sector scheme, about 570 bytes (including pad) are needed and accordingly, 545 bytes can be saved per one track. As described above, for the defect swallowing, it is necessary to reassign the sector pulse location and therefore, the first sector pulse register is storing the time values for generating the sector pulse which are offset values from the servo sector location to a location where the sector pulse for the read/write is generated. The second sector pulse register 305 has offset values of a' and a" shown in FIG. 5c, and in the track free from the defect swallowing, its value is zero.

The output value of the first sector pulse register 303 is loaded from a previously calculated table of a ROM by the microprocessor 301, and also the offset values are loaded through a calculation by the microprocessor 301. If the above values are loaded into the second sector pulse register 305, the switch 106 selects outputs of the index 309, first sector register 310 and end sector register 311, and connects/disconnects the output from the second sector pulse register 305 to the adder 307 according to the start sector register and end sector register previously loaded by the microprocessor 301. The output value of the adder 307 is stored in the third sector pulse register 308 and the value stored in the third sector pulse register 308 is an end value for the sector pulse generation. This end value is input to the comparator 312 and then is compared with the output of the counter 313. If the two compared values are identical to each other, the sector pulse generator 316 generates one sector pulse.

Another embodiment of the present invention, as illustrated in FIG. 4 operates as follows. That is to say, another method of the present invention can be performed by adding values of the first and second sector logic circuits 303' and 305' in adder 307' and supplying the added values to the third sector pulse logic circuit 308', when a program having the aforementioned function is supplied to the microprocessor 301' and loading a sector pulse without the first and second sector pulse logic circuits 303' and 305', the start sector logic circuit 310', the index logic circuit 309', the end sector logic circuit 311', the current sector logic circuit 320', the switch 316' and the adder 307'. In such a method, the values are directly added to the servo field information as in the WID or headerless manner.

The switch 306' determines a position of a currently passing sector through an index logic 309' and a current sector logic 320', and compares the position of the current sector logic with position information of a start sector and an end sector previously loaded by a microprocessor, during which time interval only an offset value stored in a second sector logic 305' is added, thereby performing an add on/off function only. Accordingly, there is no register for storing offset values in the switch logic, but it is provided a control signal only for adding the offset value stored in second sector logic to a sector pulse value stored in the first sector logic during a given time duration only. Thus, a comparator maybe included therein.

The adder 307' plays a role which bypasses a first sector logic value to third sector logic during switch-off and adds a second sector logic to third sector logic during switch-on, and The switch 306' output logic value becomes a high active state during the current sector value located between the start sector and the end sector and is added to the second sector to be loaded in the third sector logic when the switch is on at a time when the first sector logic value is loaded by the microprocessor. The first sector value is loaded as the third Sector value when the switch is low state. In order to complete this operation, the updated bit should be connected from the first sector logic to the adder so that the fact which the first sector logic was updated is known to the adder.

With the logic circuit as described above, the sector pulse for the defect swallowing can be generated, and as in a case of split servo information, the disk formatter (or, disk controller) freezes the disk operation (read/write operation) and the ECC operation just in front of the defective part for a moment and skips the defective part. Thereafter, the disk formatter performs re-synchronization and then unfreezes the ECC processing and continues to process the remaining parts of the sector. Accordingly, the present invention can be embodied by the microprocessor and the simple additional logic of a gate array, thereby having an advantage of improving the capacity and performance of a disk.

It should be understood that the present invention is not limited to the particular embodiment disclosed herein as the best mode contemplated for carrying out the present invention, but rather that the present invention is not limited to the specific embodiment described in this specification except as defined in the appended claims.

What is claimed is:

1. A sector pulse generating circuit for a hard disk drive, comprising:

a microprocessor for controlling overall an operation of said hard disk drive;

a first sector pulse storing unit for storing time values for a sector pulse generation;

a second sector pulse storing unit for storing offset values and having zero value in a track free from a defect skip;

an index generator for generating an index signal value;

a start sector storing unit for storing a start sector value;

an end sector storing unit for storing an end sector value;

a current sector storing unit for storing a current sector values;

a switching unit for receiving outputs of said index generator, start sector storing unit, current sector storing unit, and end sector storing unit and for generating an adder ON/OFF signal;

an adder for unit adding an output of said first sector pulse storing unit to an output of said second sector pulse storing unit in accordance with said adder ON/OFF signal supplied thereto by said switching unit;

a third sector storing unit for storing an end value for a sector pulse generation outputted from said adder;

a clock pulse generator for generating given clocks;

a counter for counting a clock output of said clock generating unit;

a comparator for comparing an output of said counter with an output of said third sector pulse storing unit and for detecting whether or not the two compared output values are identical to each other; and a sector pulse generator for generating a sector pulse when the two compared outputs are determined by said comparator to be identical to each other.

2. A sector pulse generating method for a hard disk drive, comprising the steps of:

controlling overall an operation of said hard disk drive;

storing time values for a sector pulse generation;

storing offset values and having zero value in a track free from a defect skip;

generating an index signal value;

storing a start sector value;

storing an end sector value;

storing current sector value;

receiving said index signal value, start sector value, current sector value, and end sector value and for generating an adder ON/OFF signal;

adding said stored values in accordance with said adder ON/OFF signal;

storing an end value for a sector pulse generation which results from said addition;

generating given clocks;

counting said clocks;

comparing said count with said end value and detecting whether or not the two compared output values are identical to each other; and generating a sector pulse when the two compared outputs are determined to be identical to each other.

3. The sector pulse generating method as claimed in claim 2, further comprising the step of outputting a current sector number which can also be selected as a selected value.

* * * * *